June 19, 1928. 1,674,194
F. H. CUMMER
DUST CHARGER FOR ROAD PLANTS
Filed April 11, 1927 2 Sheets-Sheet 1
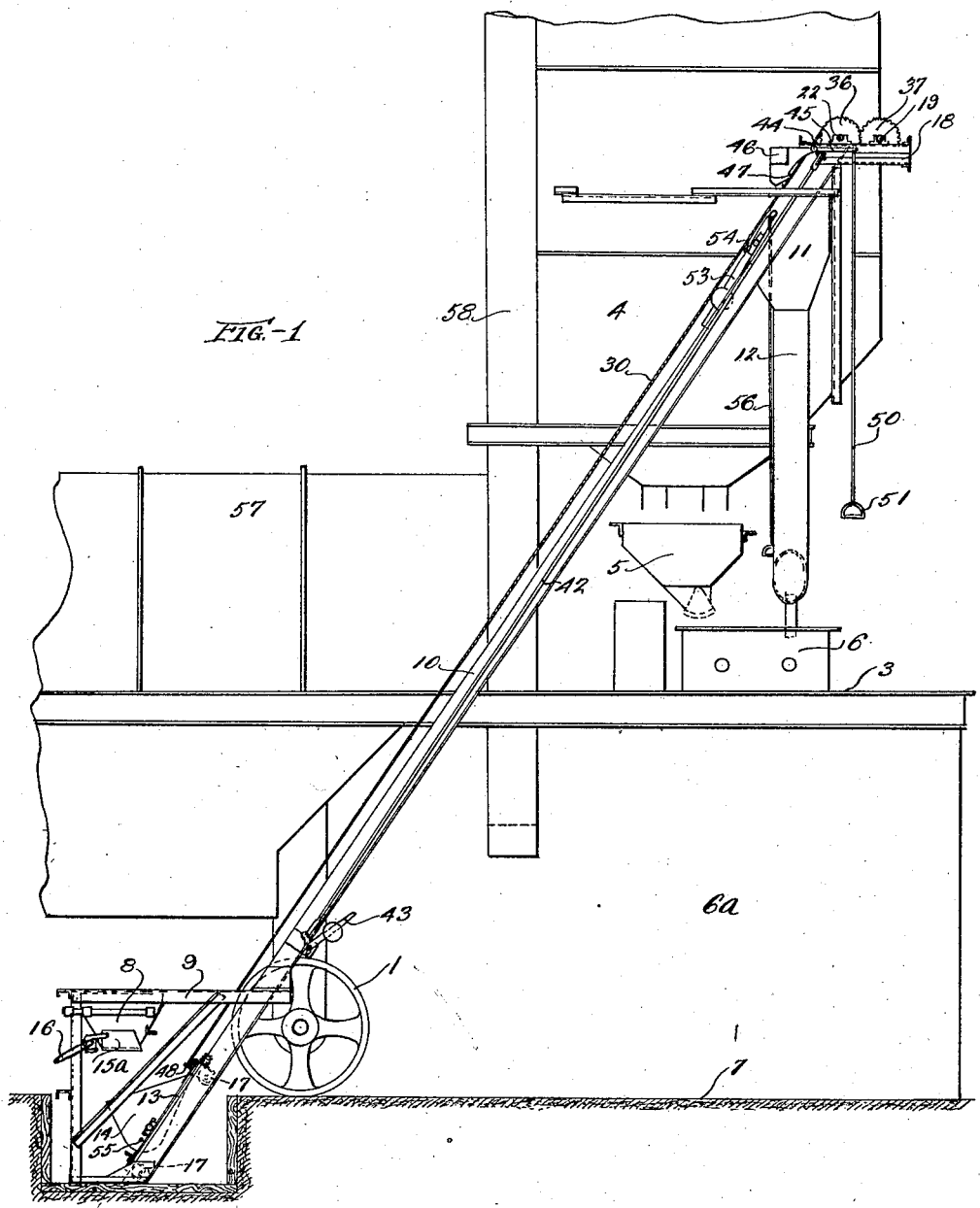

June 19, 1928.
F. H. CUMMER
1,674,194
DUST CHARGER FOR ROAD PLANTS
Filed April 11, 1927 2 Sheets-Sheet 2
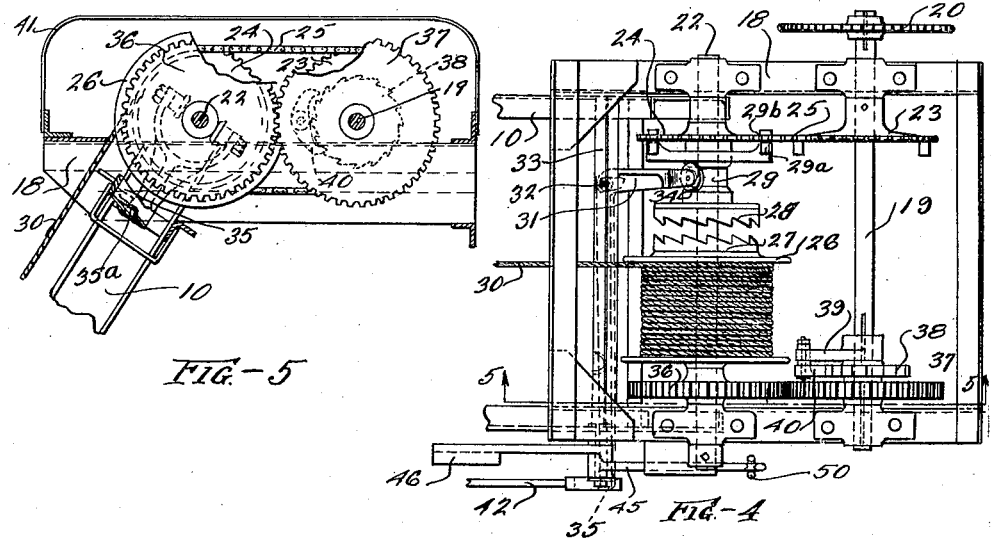
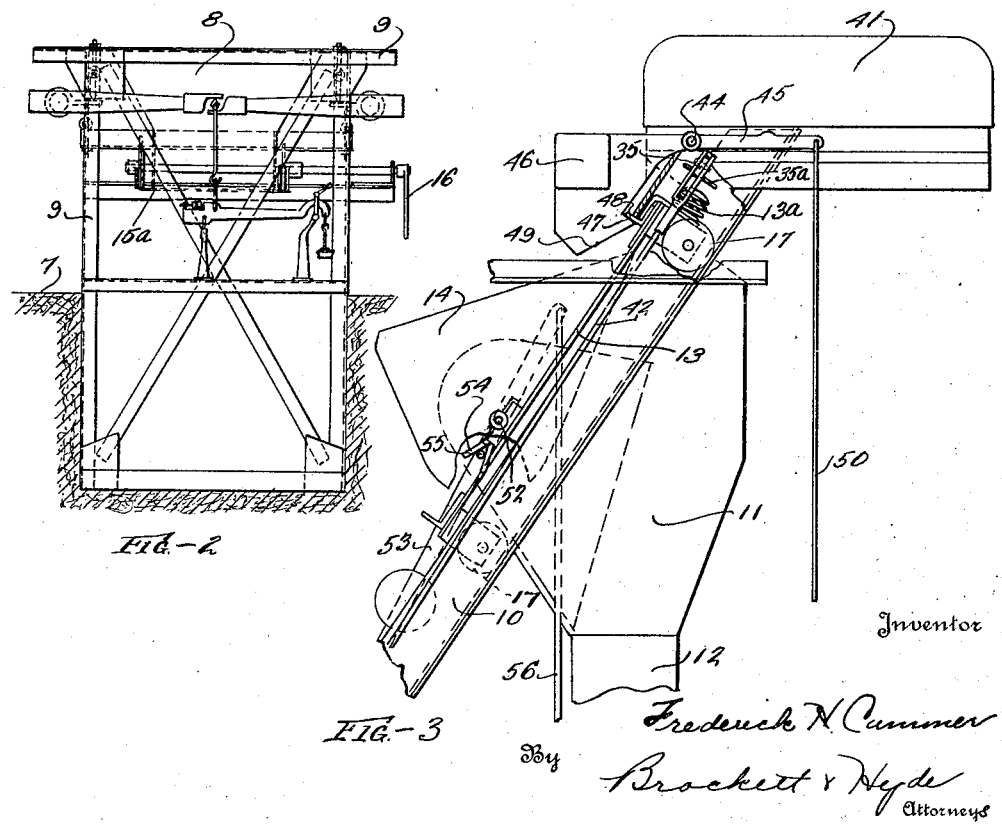
Inventor
Frederick H. Cummer
By Brockett & Hyde
Attorneys Patented June 19, 1928.

1,674,194

UNITED STATES PATENT OFFICE.

FREDERICK H. CUMMER, OF CLEVELAND HEIGHTS, OHIO.

DUST CHARGER FOR ROAD PLANTS.

Application filed April 11, 1927. Serial No. 182,940.

This invention relates to charging apparatus for use in connection with road plants, such as plants for the preparation of asphalt or like road mixtures.

Such mixtures usually require a certain proportion of fine dust handled in bags and lifted by hand and dumped into the mixer, which is located at a fairly high level, and require accurate proportioning of their ingredients. Strict specifications for road construction require at least one responsible weighing operator upon the elevated platform to insure proper feeding of the ingredients into the mixer, as well as two laborers, one on the ground and the other on the platform, to handle the fine dust. One important object of the invention, therefore, is to provide a simple apparatus which eliminates one laborer and yet speeds up the whole plant.

Another object of the invention is to provide improved apparatus for weighing the fine dust and elevating and delivering the same by power to the mixer, with the weighing and elevating under the control of one laborer on the ground, and the delivery to the mixer and return of the elevator to the ground under the control of the responsible operator.

A further object of the invention is to provide a self-contained unit of this kind which is of simple form and capable of connection to the plant or separation therefrom at will, as when the plant is moved from place to place, and which apparatus is also so arranged as to enable it to be readily driven by a power connection to the mixing plant.

A further object is to provide an improved elevator including a traveling container for the fine dust, operating means suitable for operation by a driving connection from the main plant, and control means for said container adapted for operation by one operator on the ground and another on the platform, together with means for delivering a weighed charge to the container and for discharging the container to the mixer.

Further objects of the invention are in part obvious and in part will appear more in detail hereinafter.

In the drawings, which illustrate one embodiment of the present invention, Fig. 1 is a side elevation of the rear portion of an asphalt plant with the dust charger applied thereto; Fig. 2 is an enlarged detail of the weighing mechanism at the lower end of the dust charging apparatus; Fig. 3 is a detail side elevation of the upper portion of the apparatus showing the container on its carriage; Fig. 4 is a plan view of the elevating mechanism; Fig. 5 is a sectional detail of the same taken in the plane of line 5—5, Fig. 4.

Referring to the drawings, pertinent structure of an asphalt plant of typical arrangement is shown in Fig. 1, the machine being large and heavy and adapted for movement when necessary upon wheels, one of which is indicated at 1, and including a platform 3, bins 4 for the coarser ingredients, a weighing hopper 5, and a mixer 6. The platform 3 may be at any suitable elevation above the ground level 7 enabling the contents of the mixer 6 to be dumped directly into wagons driven through the space 6ª under the platform for the purpose. In the operation of the plant accurately measured charges of dust should be delivered to the mixer 6, preferably as directly as possible from the ground level, the delivery of the dust and all other ingredients to the mixer being under the control of a fairly skilled or responsible operator upon the platform 3.

The present invention provides a frame 10 extending from the footing frame 9 to a point above the mouth portion 11 of a chute 12, a carriage 13 movable upon the frame, a bucket or container 14 mounted for dumping movement upon the carriage, and balanced in the upright position shown in Fig. 1, and operating mechanism at the top of the frame.

The footing frame 9 is secured in operative position in a small pit as indicated in Fig. 1, whereby the receptacle 8 is at a convenient low level to be loaded from the ground. Said receptacle may form part of any suitable weighing mechanism, generally indicated in Fig. 2, whereby the net weight of the receptacle contents may be accurately ascertained. It should also be adapted for dumping its contents into the elevator bucket, such as by having a movable gate or bottom 15ª, controlled by the handle 16. The frame 10 extends into the pit whereby the carriage 13, which moves in the frame upon wheels 17, may be lowered sufficiently so that the bucket 14 may receive the contents of the receptacle 8.

The frame 10 extends upwardly to connection with a head frame 18 which in turn is detachably secured to the plant frame and carries the operating mechanism, which includes (Fig. 4) a shaft 19 carrying a sprocket wheel 20 connected by a chain with a sprocket (not shown) on a continuously rotating shaft of the plant. The frame 18 carries also the shaft 22.

Fast upon the shaft 19 is a sprocket 23 connected through chain 25 to drive sprocket 24, loose upon the shaft 22, carrying a drum 26 provided with a clutch member 27 cooperating with a sliding clutch member 28 actuated by a grooved collar 29 provided with teeth 29ª sliding but never leaving openings 29ᵇ in sprocket 24. The mechanism described connects the drum 26 to be driven by sprocket 20. From the drum a flexible cable 30 extends to the carriage 13. The direction of rotation of sprocket 20 is such that upon engagement of the clutch the drum winds up the cable 30 and elevates the carriage 13.

Clutch member 28 is controlled by the bell crank lever 31 pivoted at 32 upon a member 33 of the frame 18, one end of the bell crank carrying a pair of rollers 34 in the groove of collar 29, and its opposite end 35 projecting laterally and having an abutment 35ª to be engaged by a yielding bumper 13ª on the carriage 13 as the same completes its upward travel, to automatically disengage the drum drive.

Secured to rotate with the drum is a gear 36 meshing with a gear 37 secured with a ratchet wheel 38. Upon the shaft 19 adjacent the ratchet wheel is an arm 39 carrying at its outer end an escapement pawl or detent 40 pivotally mounted thereon and adapted for engagement with the teeth of the ratchet wheel 38. The pawl as indicated in Fig. 5 has two arms, one adapted to engage the teeth of the ratchet, the other adapted to be moved outward by the teeth to insure positive engagement with the wheel, whatever be the position of the pawl circumferentially thereof.

The drum rotates clockwise to elevate the bucket and carriage. Gear 37, with the ratchet wheel 38, always rotates in a counterclockwise direction, Fig. 5, and the pawl 40 idles over the ratchet teeth while the carriage is being elevated. Upon release of the clutch, however, the weight of the bucket and carriage will cause the drum to rotate reversely, and the ratchet wheel 38 therefore will rotate in reverse direction, with its rotation limited by engagement of the pawl 40 with the ratchet wheel, whereby the speed of the shaft 19 controls that of the drum. The mechanism described may be enclosed by a suitable cover 41.

Connecting with the laterally extending arm 35 of the bell-crank 31 is a rod 42 extending downwards along the frame 10 to connection with a weighted lever 43 accessible to an operator at the ground level and tending to maintain itself in the position indicated in Fig. 1, with the drum clutch disengaged until it is desired to elevate the bucket, when a throw of the lever 43 in the counterclockwise direction, Fig. 1 will engage the clutch, the weight on the lever then holding the clutch in engagement until the carriage arrives at the upper limit of its travel and throws the lever arm 35 to disengage the clutch.

Pivoted at 44 on the frame 18 is a latch lever 45 carrying a weight 46 and provided with a latch projection 47 engageable with a member 48 on the carriage 13, the cam portion 49 of the lever 45 allowing the portion 47 to clear the member 48 as the carriage arrives at its topmost position. Connecting with the lever 45 is a pull rod 50 provided with a handle 51 within easy grasp of an operator on the platform 3, whereby the operator by a pull upon the handle 51 may move the lever 45 to disengage the carriage and allow controlled or governed downward travel of the bucket along the track 10, as described.

Pivotally mounted near the upper end of one of the members of the frame 10, at a point 52 in alignment with the axis of the bucket 14 in its carriage when latched by the lever 45 as described, is a lever 53 provided with a Y-shaped member 54 in the plane of a lug 55 projecting from the side of the bucket 14. The lever 53 is weighted as indicated in Fig. 3 to align the yoke 54 with the lug 55 whereby as the carriage with the bucket comes to rest at the upper limit of its travel the lever 53 is adapted to engage the lug 55 for movement in a clockwise direction, Fig. 3 to dump the bucket and empty the contents thereof into the mouth 11 of the chute 12. A pull rod 56 extends downwards from the upper extremity of the lever 53 within reach of an operator on the platform 3, for this purpose.

Operation of the charger, assuming the parts in the position indicated in Fig. 1 is as follows: The operator upon the ground level weighs a charge of dust in the receptacle 8 and by a pull upon the lever 16 delivers it to the bucket 14. He next throws the lever 43 to close the drum clutch, whereupon the bucket moves upwardly along the frame 10. When it arrives at its upper position the carriage disengages the drum clutch and is latched or held by the lever 45. The operator upon the mixer platform now pulls down the rod 56 to dump the contents of the bucket 14 through the chute 12 into the mixer 6. He then releases the latch and the bucket descends by gravity to its lower position, in which it may be again immediately reloaded from the receptacle 8 which the operator at ground level has meanwhile refilled with another weighed charge.

During the operation of the charger the other parts of the plant are functioning to deliver the coarser ingredients to the mixer 6, for example the drier 57 of the plant is delivering a dry heated component to the elevator 58 arranged to discharge into the bins 4 through screening mechanism, not specifically shown. While such a procedure is feasible for the coarser ingredients the maintenence of the fine dust in such an elevated bin has been found impossible owing to the characteristic of the fine material to cake and arch over the bin mouth; and, it is for this very reason that I have provided for the means described for delivering the fine dust directly to the mixer 6.

What I claim is:

1. An asphalt plant having an elevated platform and a mixer adjacent said platform for receiving material to be mixed, and fine dust charging means therefor, comprising a frame adapted to rest upon the ground and to be attached to the plant frame, a dumping container movable thereon from ground level to a platform position where it discharges to the mixer, operating means for said container, controlling means for said operating means operable at ground level for causing the container to rise, and additional controlling means for said operating means operable at platform level for causing the container to descend.

2. An asphalt plant having an elevated platform and a mixer adjacent said platform for receiving material to be mixed, and fine dust charging means therefor, comprising a frame adapted to rest upon the ground and to be attached to the plant frame, a dumping container movable thereon from ground level to a platform position where it discharges to the mixer, operating means for said container, controlling means for said operating means operable at ground level for causing the container to rise, means operable at platform level for dumping said container, and additional controlling means for said operating means operable at platform level for causing the container to descend.

3. An asphalt plant having an elevated platform and a mixer adjacent said platform for receiving material to be mixed, and fine dust charging means therefor, comprising a frame adapted to rest upon the ground and to be attached to the plant frame, a dumping container movable thereon from ground level to a platform position where it discharges to the mixer, means located and operable at ground level for delivering a weighed charge to said container, operating means for said container, controlling means for said operating means operable at ground level for causing the container to rise, and additional controlling means for said operating means operable at platform level for causing the container to descend.

4. An asphalt plant having an elevated platform and a mixer adjacent said platform for receiving material to be mixed, and fine dust charging means therefor, comprising a frame adapted to rest upon the ground and to be attached to the plant frame, a dumping container movable thereon from ground level to a platform position where it discharges to the mixer, operating means for said container, controlling means for said operating means operable at ground level for causing the container to rise, means operable at platform level for dumping said container, a chute arranged to receive the charge dumped from said container and to conduct the same to the mixer, and additional controlling means for said operating means operable at platform level for causing the container to descend.

5. A fine dust charger for asphalt plants, comprising a frame adapted to be supported on the ground and detachably secured with an asphalt plant, a carriage adapted for raising and lowering movement in said frame when so arranged, a dumping bucket on said carriage, a drum on said frame in connection with said carriage to raise the same, operating means for said drum including means for controlling the speed of said drum during lowering of said carriage, controlling means for said drum operable at ground level for causing the carriage to rise, and controlling means for said carriage operable from an elevated position on the plant to which the frame may be secured, for causing lowering of said carriage.

6. A fine dust charger for asphalt plants, comprising a frame adapted to be supported on the ground and detachably secured with an asphalt plant, a carriage adapted for raising and lowering movement in said frame when so arranged, a dumping bucket on said carriage, a drum on said frame in connection with said carriage to raise the same, operating means for said drum including means for controlling the speed of said drum during lowering of said carriage, controlling means for said drum operable at ground level for causing the carriage to rise, means operable from an elevated position on the plant to which the frame may be secured for dumping said bucket, and controlling means for said carriage operable from said elevated position on the plant, for causing lowering of said carriage.

7. A fine dust charger for asphalt plants, comprising a frame adapted to be supported on the ground and detachably secured with an asphalt plant, a cariage adapted for raising and lowering movement in said frame when so arranged, a dumping bucket on said carriage, a drum on said frame in connection with said carriage to raise the same, operating means for said drum including means for controlling the speed of said drum during lowering of said carriage, controlling means for said drum operable at ground level for causing the carriage to rise, latching means on said frame for maintaining the carriage in elevated position thereon, means operable from an elevated position on the plant to which the frame may be secured for dumping said bucket, and means for releasing said carriage latch for causing lowering of said carriage and operable from said elevated position on the plant.

8. A fine dust charger for asphalt plants, comprising a frame adapted to be supported on the ground and detachably secured with an asphalt plant, a carriage adapted for raising and lowering movement in said frame when so arranged, a dumping bucket on said carriage, a drum on said frame in connection with said carriage to raise the same, operating means for said drum including means for controlling the speed of said drum during loading of said carriage, means located and operable at ground level for delivering a weighed charge to said container, controlling means for said drum operable at ground level for causing the carriage to rise, latching means for securing the carriage in elevated position in said frame, means operable from an elevated position on the plant to which the frame may be secured for dumping said bucket and means operable from said elevated position on the plant for releasing said latching means to cause lowering of said carriage.

9. A fine dust charger for asphalt plants, comprising a frame adapted to be supported on the ground and detachably secured with an asphalt plant, a carriage adapted for raising and lowering movement in said frame when so arranged, a dumping bucket on said carriage, a drum on said frame in connection with said carriage to raise the same, operating means for said drum including means for controlling the speed of said drum during loading of said carriage, means supported on said frame and operable at ground level for delivering a weighed charge to said container, controlling means for said drum operable at ground level for causing the carriage to rise, latching means for securing the carriage in elevated position in said frame, means operable from an elevated position on the plant to which the frame may be secured for dumping said bucket and means operable from said elevated position on the plant for releasing said latching means to cause lowering of said carriage.

10. A fine dust charger for asphalt plants, comprising a frame adapted to be supported on the ground and detachably secured with an asphalt plant, a carriage adapted for raising and lowering movement in said frame when so arranged, a dumping bucket on said carriage, a drum on said frame in connection with said carriage to raise the same, operating means for said drum including a clutch engageable to actuate said drum to elevate said carriage, and an escapement adapted to overrun during carriage elevating actuation of said drum and to engage during reverse actuation of said drum to limit the lowering speed of said carriage, controlling means for said drum clutch operable at ground level, and controlling means for said carriage operable from an elevated position on the plant to which the frame may be secured, for causing lowering of said carriage.

11. A fine dust charger for asphalt plants, comprising a frame adapted to be supported on the ground and detachably secured with an asphalt plant, a carriage adapted for raising and lowering movement in said frame when so arranged, a dumping bucket on said carriage, a drum on said frame in connection with said carriage to raise the same, operating means for said drum including a clutch engageable to actuate said drum to elevate said carriage, and an escapement adapted to over-run during carriage elevating actuation of said drum and to engage during reverse actuation of said drum to limit the lowering speed of said carriage, controlling means for said drum clutch operable at ground level for causing the carriage to rise and engageable by the carriage at the upper extremity of the frame to disengage the clutch, latch means on said frame for maintaining the carriage in elevated position, means engageable with said bucket in said latched carriage position, for dumping the same and operable from an elevated position on the plant to which the frame may be secured, and means operable from said elevated position on the plant, for releasing said latch for causing lowering of said carriage.

12. A fine dust charger for asphalt plants, comprising a frame adapted to be supported on the ground and detachably secured with an asphalt plant, a carriage adapted for raising and lowering movement in said frame when so arranged, a dumping bucket on said carriage, a drum on said frame in connection with said carriage to raise the same, operating means for said drum comprising a shaft adapted to be driven by driving means on the plant, a second shaft carrying said drum, a member rotatable on said second shaft, driving means between said member and said first named shaft, a clutch engageable to cause rotation of said drum with said member, a member rotatable with said drum and in driving relation with a member loose upon said first named shaft, a member secured with said first named shaft and adapted to overrun said member loose thereon during drum actuation to raise said carriage and to engage said loose member during reverse actuation of said drum to limit lowering movement of said carriage, controlling means for said clutch operable at ground level for causing the carriage to rise and engageable for release by said carriage in the upper extremity of its travel in said frame, latching means for said carriage in said elevated position thereof, means engageable with said bucket in said elevated position of said carriage and operable from an elevated position on the plant to which the frame may be secured for dumping said bucket, and means operable from said elevated position on the plant for releasing said latch for causing lowering of said carriage.

In testimony whereof I hereby affix my signature.

FREDERICK H. CUMMER.